United States Patent
Park et al.

(10) Patent No.: US 9,995,962 B2
(45) Date of Patent: Jun. 12, 2018

(54) BACKLIGHT UNIT AND DISPLAY APPARATUS INCLUDING THE SAME

(71) Applicant: Samsung Display Co., Ltd., Yongin-Si, Gyeonggi-Do (KR)

(72) Inventors: Young-min Park, Hwaseong-si (KR); Sangwon Lee, Seoul (KR); Younghye Son, Seoul (KR); Jiwon Lee, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days. days.

(21) Appl. No.: 15/152,014

(22) Filed: May 11, 2016

(65) Prior Publication Data

US 2016/0363817 A1    Dec. 15, 2016

(30) Foreign Application Priority Data

Jun. 12, 2015  (KR) .................. 10-2015-0083554
Mar. 8, 2016  (KR) .................. 10-2016-0027844

(51) Int. Cl.
- *G09F 13/04* (2006.01)
- *G09F 13/08* (2006.01)
- *G02F 1/1335* (2006.01)

(52) U.S. Cl.
CPC .. *G02F 1/133611* (2013.01); *G02F 1/133603* (2013.01); *G02F 1/133605* (2013.01)

(58) Field of Classification Search
CPC ......... G02F 1/133611; G02F 1/133606; G02F 1/133605; G02F 1/133603
See application file for complete search history.

(56) References Cited

U.S. PATENT DOCUMENTS

| | | | | |
|---|---|---|---|---|
| 2006/0289201 A1* | 12/2006 | Kim | .................. | G02F 1/133603 174/261 |
| 2008/0316750 A1* | 12/2008 | Park | .................. | G02F 1/133603 362/294 |
| 2011/0261290 A1* | 10/2011 | Kim | ..................... | G02B 6/0021 349/64 |
| 2014/0078720 A1* | 3/2014 | An | ..................... | G02F 1/133603 362/97.1 |
| 2014/0204578 A1* | 7/2014 | Kim | ........................ | F21V 11/16 362/235 |
| 2015/0049464 A1* | 2/2015 | Park | ........................ | F21V 21/00 362/97.1 |

FOREIGN PATENT DOCUMENTS

| | | | | |
|---|---|---|---|---|
| JP | 4514825 B2 * | 7/2010 | ............ | H01L 33/00 |
| KR | 100628264 B1 | 9/2006 | | |
| KR | 101327835 B1 | 11/2013 | | |
| KR | 200471491 Y1 | 2/2014 | | |
| KR | 1020140128511 A | 11/2014 | | |

* cited by examiner

*Primary Examiner* — Donald Raleigh
(74) *Attorney, Agent, or Firm* — Cantor Colburn LLP

(57) ABSTRACT

A display apparatus includes a display panel displaying an image using a light and a backlight unit generating the light, providing the light to the display panel and including a plurality of light source units generating the light and a plurality of light source substrates arranged in a first direction and disposed on the plurality of light source substrates where the plurality of light source substrates have a zigzag shape, and the plurality of light source units are disposed at predetermined areas of bending portions of the zigzag shape.

23 Claims, 10 Drawing Sheets

BACKLIGHT UNIT AND DISPLAY APPARATUS INCLUDING THE SAME

This application claims priority to Korean Patent Applications No. 10-2015-0083554, filed on Jun. 12, 2015, and Korean Patent Applications No. 10-2016-0027844, filed on Mar. 8, 2016, and all the benefits accruing therefrom under 35 U.S.C. § 119, the contents of which in their entireties are herein incorporated by reference.

BACKGROUND

1. Field

Exemplary embodiments of the invention relate to a backlight unit and a display apparatus including the same. More particularly, exemplary embodiments of the invention relate to a backlight unit which prevents a dark area from occurring and a display apparatus including the backlight unit.

2. Description of the Related Art

In general, a display apparatus includes a display panel displaying an image and a backlight unit providing a light to the display panel. The display panel includes a first substrate on which pixels are arranged, a second substrate facing the first substrate, and an image display layer disposed between the first and second substrates.

The image display layer is operated by the pixels, and a transmittance of the light is controlled by the image display layer, thereby displaying the image. The image display layer includes a liquid crystal layer, an electrowetting layer, or an electrophoretic layer, for example.

The backlight unit is classified into an edge-illumination type backlight unit adjacent to a side surface of the display panel to generate the light and a direct-illumination type backlight unit disposed under the display panel to generate the light. The direct-illumination type backlight unit includes a plurality of light source units generating the light. The light source units are a side surface light-emitting type diode to emit the light through a side surface of the light source units.

The display apparatus typically has been manufactured in a flat shape, but a display apparatus with a curved display panel is being developed recently.

SUMMARY

Exemplary embodiments of the invention provide a backlight unit which prevents a dark area from occurring.

Exemplary embodiments of the invention provide a display apparatus including the backlight unit.

Exemplary embodiments of the invention provide a display apparatus including a display panel displaying an image using a light and a backlight unit generating the light and providing the light to the display panel. The backlight unit includes a plurality of light source units generating the light and a plurality of light source substrates arranged in a first direction. The plurality of light source units are disposed on the plurality of light source substrates, the plurality of light source substrates have a zigzag shape, and the plurality of light source units are disposed at predetermined areas of bending portions of the zigzag shape.

In an exemplary embodiment, each of the plurality of light source substrates may include a plurality of first extending portions arranged in a second direction crossing the first direction and a plurality of second extending portions arranged in the second direction and disposed between the plurality of first extending portions. The plurality of first extending portions may extend in a first diagonal direction crossing the first and second directions on a plane substantially parallel to the first and second directions, the plurality of second extending portions may extend in a second diagonal direction crossing the first direction, the second direction, and the first diagonal direction on the plane, each of the plurality of second extending portions may connect the opposite end of a k-th first extending portion, which is opposite to one end of the k-th first extending portion, and one end of a (k+1)th first extending portion, where "k" is a natural number.

In an exemplary embodiment, the opposite end of the k-th first extension portion and the one end of the (k+1)th first extending portion may be closer to each other than the one end of the k-th first extending portion and the opposite end of the (k+1)th first extending portion, which is opposite to the one end of the (k+1)th first extending portion.

In an exemplary embodiment, the plurality of light source units may be disposed at predetermined areas of connection portions of the first extending portions and the plurality of second extending portions, which are defined by the bending portions.

In an exemplary embodiment, the plurality of first and second extending portions adjacent to each other may define a first angle.

In an exemplary embodiment, the plurality of first angle may be in a range from about 45 degrees to about 135 degrees.

In an exemplary embodiment, the plurality of first and second extending portions adjacent to each other may be symmetrical with each other.

In an exemplary embodiment, each of the plurality of light source substrates has a first width in the first direction, and the plurality of light source substrates may be arranged spaced apart from each other by a second width greater than the first width in the first direction.

In an exemplary embodiment, the backlight unit and the display panel may be curved with respect to the first direction and substantially parallel to a second direction crossing the first direction.

In an exemplary embodiment, the display apparatus may further include a first protective member to accommodate the backlight unit, the first protective member in which a plurality of grooves each having a zigzag shape is defined, and the plurality of light source substrates inserted into the grooves.

In an exemplary embodiment, the backlight unit further may include a reflection sheet in which a plurality of holes into which the plurality of light source units are inserted is defined, a diffusion plate disposed on the plurality of light source units to diffuse the light provided from the plurality of light source units, and an optical sheet disposed on the diffusion plate to diffuse and condense the light from the diffusion plate, and the display panel is disposed on the optical sheet.

In an exemplary embodiment, each of the plurality of light source units may include a side surface light-emitting type diode.

In an exemplary embodiment, the bending portions may have a curved shape.

Exemplary embodiments of the invention provide a backlight unit including a plurality of light source units generating a light and a plurality of light source substrates arranged in a first direction, the plurality of light source units being disposed on the plurality of light source units. Each of the plurality of light source substrates includes a plurality of first extending portions arranged in a second direction crossing the first direction and a plurality of second extending portions arranged in the second direction and disposed between the plurality of first extending portions. The plurality of first extending portions extends in a first diagonal direction crossing the first and second directions on a plane substantially parallel to the first and second directions, the plurality of second extending portions extends in a second diagonal direction crossing the first direction, the second direction, and the first diagonal direction on the plane, and each of the plurality of second extending portions connects the opposite end of a k-th first extending portion, which is opposite to one end of the k-th first extending portion, and one end of a (k+1)th first extending portion.

Exemplary embodiments of the invention provide a display apparatus including a display panel displaying an image using a light and a backlight unit generating the light and providing the light to the display panel. The backlight unit includes a plurality of light source units generating the light and a plurality of light source substrates arranged in a first direction, the plurality of light source units being disposed on the plurality of light source substrates. Each of the plurality of light source substrates includes a first sub-extending portions arranged in a second direction crossing the first direction, a second sub-extending portions alternately arranged with the first sub-extending portions in the second direction, a plurality of second extending portions extending in the second direction and arranged in the second direction, and a plurality of third extending portions extending in the second direction and arranged in the second direction. The first sub-extending portions extend to define a second angle with the second direction, the second sub-extending portions extend to define a third angle, which is obtained by subtracting the second angle from about 180 degrees, with the second direction, each of the plurality of second extending portions connects one end of a h-th first sub-extending portion and one end of a h-th second sub-extending portion, each of the third extending portions connects the opposite end of the h-th second sub-extending portion, which is opposite to the one end of the h-th second sub-extending portion, and the opposite end of a (h+1)-th first sub-extending portion, which is opposite to one end of the (h+1)-th first sub-extending portion, and the plurality of light source units is disposed at predetermined areas of connection portions of the first and second sub-extending portions and the second and third extending portions.

According to the above, the distance between the light source units of the display device becomes larger, and thus an amount of the light, which is blocked by the light source units adjacent to each other, may be reduced. Thus, the dark area may be prevented from occurring between the light source units adjacent to each other.

BRIEF DESCRIPTION OF THE DRAWINGS

The above and other advantages of the invention will become readily apparent by reference to the following detailed description when considered in conjunction with the accompanying drawings, in which.

DETAILED DESCRIPTION

Figure 1:
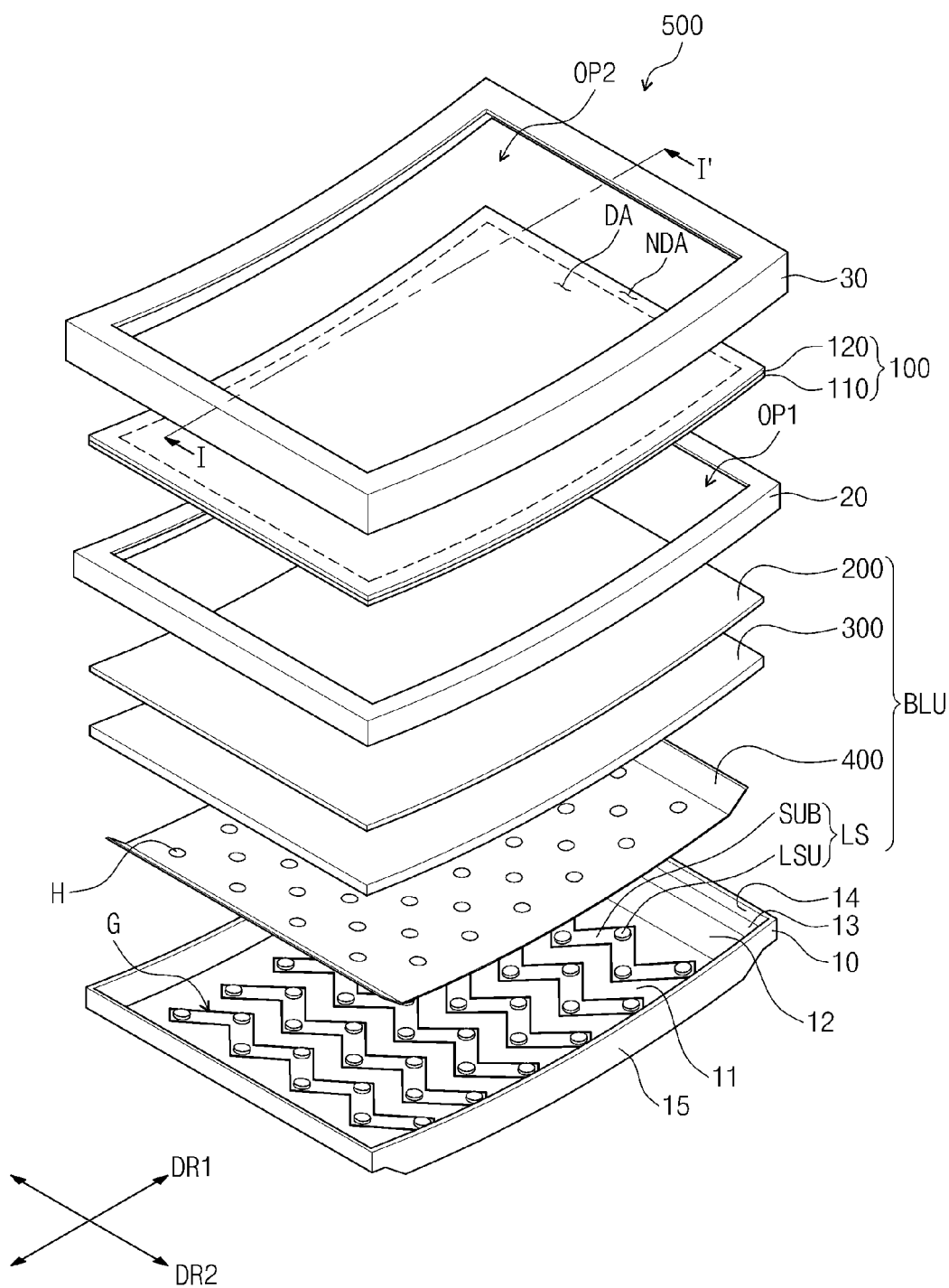
FIG. 1 is an exploded perspective view showing an exemplary embodiment of a display apparatus according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this invention will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). In an exemplary embodiment, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

FIG. 1 is an exploded perspective view showing a display apparatus 500 according to an exemplary embodiment of the invention.

Referring to FIG. 1, the display apparatus 500 has long sides in a first direction DR1 and short sides in a second direction DR2 crossing the first direction DR1. The display apparatus 500 may be, but not limited to, a curved display apparatus. In an exemplary embodiment, the display apparatus 500 has a shape curved with respect to the first direction DR1 and substantially parallel to the second direction DR2, for example.

The display apparatus 500 includes a display panel 100 displaying an image using a light, a backlight unit BLU generating the light and providing the light to the display panel 100, and protective members 10, 20, and 30 accommodating and protecting the display panel 100 and the backlight unit BLU.

The display panel 100, the backlight unit BLU, and the protective members 10, 20, and 30 have long sides in the first direction DR1 and short sides in the second direction DR2. The display panel 100, the backlight unit BLU, and the protective members 10, 20, and 30 have a shape curved with respect to the first direction DR1 and substantially parallel to the second direction DR2.

Although not shown in FIG. 1, the display panel 100 includes a plurality of pixels displaying an image using a light. In an exemplary embodiment, each pixel displays one of primary colors such as red, green, and blue colors, but it should not be limited thereto or thereby. That is, the primary colors may further include a variety of color, e.g., white, yellow, cyan, magenta, etc.

In an exemplary embodiment, the display panel 100 may be a liquid crystal display panel including a liquid crystal layer. In an exemplary embodiment, the display panel 100 includes a first substrate 110 on which a plurality of pixels is arranged, a second substrate 120 facing the first substrate 110, and a liquid crystal layer (not shown) disposed between the first substrate 110 and the second substrate 120, for example.

However, according to other exemplary embodiments, the display panel 100 may be an electrophoretic display panel including an electrophoretic layer or an electrowetting display panel including an electrowetting layer, for example.

The display panel 100 includes a display area DA and a non-display area NDA disposed at a predetermined area of a boundary of the display panel 100 to surround the display area DA when viewed in a plan view. The pixels are disposed in the display area DA, and a driver (not shown) driving the pixels is disposed in the non-display area NDA. The display area DA displays the image, and the non-display area NDA does not display the image.

The backlight unit BLU is disposed at a rear side of the display panel 100 and provides a light to the display panel 100. In an exemplary embodiment, the backlight unit BLU may be, but not limited to, a direct-illumination type backlight unit, for example.

The backlight unit BLU includes an optical sheet 200, a diffusion plate 300, a reflection sheet 400, and a plurality of light sources LS. The optical sheet 200, the diffusion plate 300, and the reflection sheet 400 have long sides in the first direction DR1 and short sides in the second direction DR2. The diffusion plate 300 has a shape curved with respect to the first direction DR1 and substantially parallel to the second direction DR2 and has a rigidity.

The optical sheet 200 is disposed on the diffusion plate 300, and the reflection sheet 400 is disposed under the diffusion plate 300. The display panel 100 is disposed on the optical sheet 200, and the light sources LS are disposed under the diffusion plate 300.

Each of the light sources LS has a zigzag shape, and the light sources LS are arranged in the first direction DR1. The light sources LS generates the light and provides the light to the diffusion plate 300. In an exemplary embodiment, the light generated by the light sources LS may be, but not limited to, a white light, for example.

The diffusion plate 300 includes a dispersing agent distributed in the diffusion plate 300 or a dispersing agent layer (not shown) coated on a surface of the diffusion plate 300. The diffusion plate 300 diffuses the light provided from the light sources LS and provides the diffused light to the optical sheet 200.

The optical sheet 200 diffuses the light provided from the diffusion plate 300 and condenses the light provided from the diffusion plate 300 in an upward direction perpendicular to a plane defined by the first and second directions DR1 and DR2 at which the display panel 100 is disposed. Although not shown in figures, the optical sheet 200 includes a diffusion sheet, a prism sheet disposed on the diffusion sheet, and a protection sheet disposed on the prism sheet to protect the prism sheet from external impacts such as scratch.

The diffusion sheet diffuses the light provided from the diffusion plate 300. The prism sheet condenses the light, which is diffused in the diffusion sheet, to the upward direction that is perpendicular to the plane.

The light exiting from the prism sheet travels in the upward direction and provided to the display panel 100 with a uniform brightness distribution. The display panel 100 displays the image using the light provided from the optical sheet 200.

A plurality of holes H is defined through the reflection sheet 400 disposed under the diffusion plate 300. Each of the light sources LS includes a plurality of light source units LSU generating the light and a light source substrate SUB on which the light source units are dispose (e.g., mounted). The holes H of the reflection sheet 400 respectively correspond to the light source units LSU.

The light source units LSU are inserted into the holes H, and the reflection sheet 400 reflects the light provided from the light source units LSU along a rear side of the reflection sheet 400 to provide the reflected light to the diffusion plate 300. The structure in which the light source units LSU are inserted into the holes H will be described in detail with reference to FIG. 3.

The light source substrates SUB are arranged in the first direction DR1, and each of the light source substrates SUB has a zigzag shape. In an exemplary embodiment, the light source units LSU are disposed at predetermined areas of bending portions of the zigzag shape of the light source substrates SUB. In an exemplary embodiment, each of the light source units LSU includes a light emitting diode ("LED"), for example. In an exemplary embodiment, the LED may be, but not limited to, a side surface light-emitting type diode.

In an exemplary embodiment, each of the light source units LSU has a substantially cylindrical shape, for example, but the shape of the light source units LSU should not be limited to the cylindrical shape. According to exemplary embodiments, each of the light source units LSU may have a substantially cuboid shape, for example. The light generated by the light source units LSU is provided to the diffusion plate 300.

The protective members 10, 20, and 30 include a first protective member 10, a second protective member 20, and a third protective member 30. The first protective member 10 may be also referred to as a bottom chassis, the second protective member 20 may be also referred to as a middle frame, and the third protective member 30 may be also referred to as a top chassis.

The first protective member 10 includes a bottom portion 11, two inclined portions 12, two connection portions 13, two first sidewall portions 14, and two second sidewall portions 15. The bottom portion 11 has long sides in the first direction DR1 and short sides in the second direction DR2. The bottom portion 11 has a shape curved with respect to the first direction DR1 and substantially parallel to the second direction DR2.

A plurality of grooves G recessed from an upper surface of the bottom portion 11 to a lower surface of the bottom portion 11 is defined in the bottom portion 11. The grooves G have the same zigzag shape as that of the light source substrates SUB and respectively correspond to the light source substrate SUB. The light source substrates SUB of the light sources LS are inserted into the grooves G, respectively.

The inclined portions 12 are respectively connected to both ends of the bottom portion 11 in the first direction DR1. The inclined portions 12 include inclined surfaces bent upward from the bottom portion 11 at a predetermined angle. The inclined portions 12 extend outward from the ends of the bottom portion 11 to have the predetermined angle with respect to the upward direction.

The connection portions 13 are respectively connected to the opposite ends of the inclined portions 12 opposite to the one ends of the inclined portions 12, which are respectively connected to both ends of the bottom portions 11, in the first direction DR1. The connection portions 13 have a flat shape.

The first sidewall portions 14 are respectively connected to the opposite ends of the connection portions 13 opposite to one ends of the connection portions 13, which are respectively connected to both ends of the inclined portions 12, in the first direction DR1. The first sidewall portions 14 extend in the upward direction.

The second sidewall portions 15 connect both ends of the bottom portion 11, both ends of the inclined portions 12, both ends of the connection portions 13, and both ends of the first sidewall portions 14 in the second direction DR2 and extend in the first direction DR1. The second sidewall portions 15 are perpendicular to a plane substantially parallel to the first and second directions DR1 and DR2.

The second protective member 20 is disposed between the display panel 100 and the backlight unit BLU. The second protective member 20 may have a rectangular frame shape. The second protective member 20 corresponds to the non-display area NDA of the display panel 100. The protective member 20 includes a first opening OP1.

The third protective member 30 is disposed on the display panel 100. The third protective member 30 has a rectangular frame shape, for example. The third protective member 30 includes a second opening OP2 through which the display area DA of the display panel 100 is exposed. The second opening OP2 overlaps with the first opening OP1 and is smaller than the first opening OP1.

The structure in which the display panel 100 and the backlight unit BLU are accommodated in the protective members 10, 20, and 30 will be described in detail with reference to FIG. 3.

Figure 2:
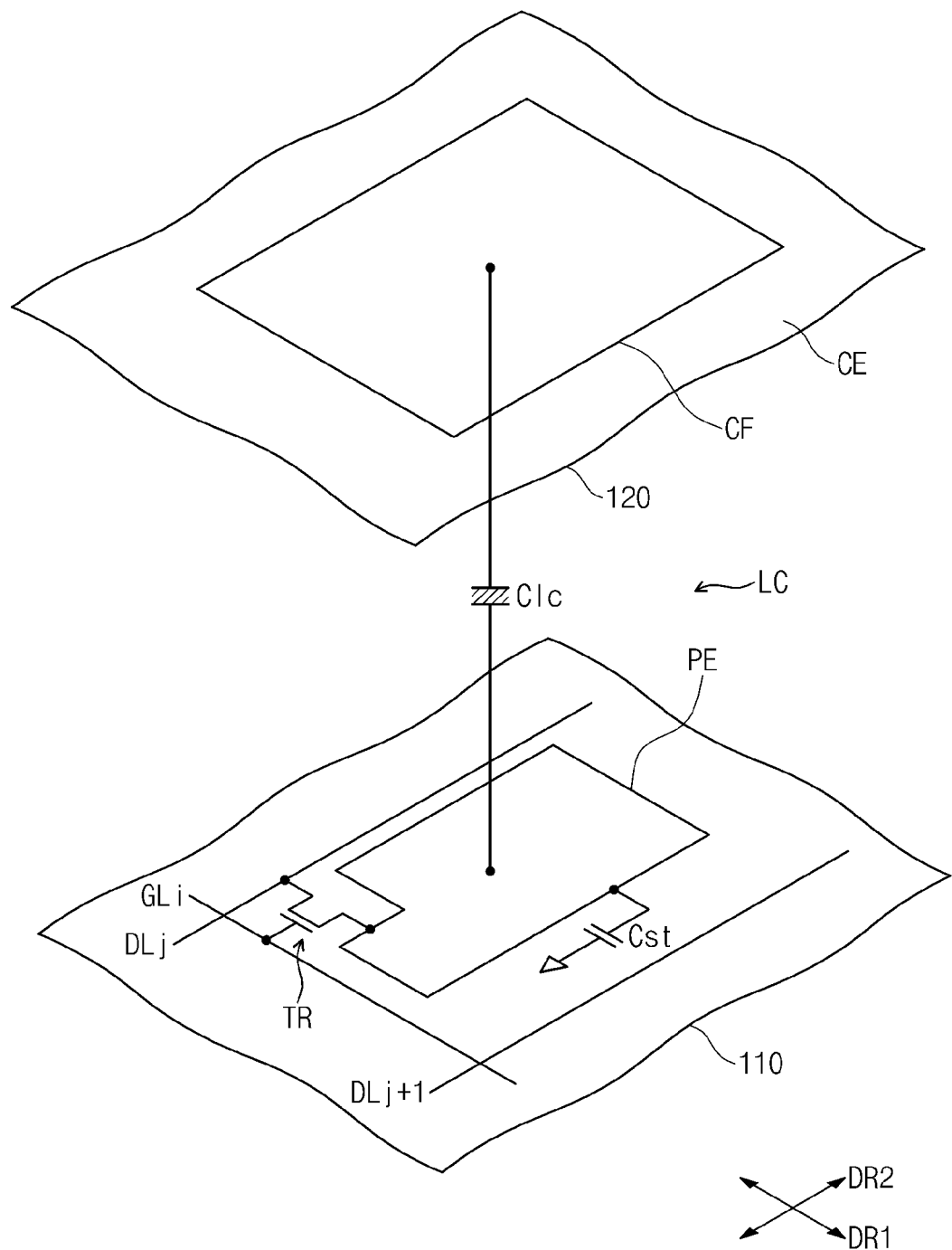
FIG. 2 is a view showing a configuration of a pixel among pixels disposed on a display panel shown in FIG. 1.

FIG. 2 is a view showing a configuration of a pixel among pixels disposed on the display panel shown 100 in FIG. 1.

FIG. 2 shows only one pixel as a representative example, but other pixels shown in FIG. 2 have the same structure and function as those of the pixel shown in FIG. 2.

Referring to FIG. 2, the display panel 100 includes the first substrate 110, the second substrate 120 facing the first substrate 110, and the liquid crystal layer LC disposed between the first substrate 110 and the second substrate 120.

The pixel includes a transistor TR connected to a gate line GLi and a data line DLj, a liquid crystal capacitor Clc connected to the transistor TR, and a storage capacitor Cst connected to the liquid crystal capacitor Clc in parallel. In another exemplary embodiment, the storage capacitor Cst may be omitted. The gate line GLi extends in the first direction DR1, and the data line DLj extends in the second direction DR2. Here, each of "i" and "j" is a natural number.

The gate line GLi, the data line DLj, and the transistor TR are disposed on the first substrate 110. The transistor TR includes a gate electrode connected to the gate line GLi, a source electrode connected to the data line DLj, and a drain electrode connected to the liquid crystal capacitor Clc and the storage capacitor Cst.

The liquid crystal capacitor Clc includes a pixel electrode PE disposed on the first substrate 110, a common electrode CE disposed on the second substrate 120 to face the pixel electrode PE, and a liquid crystal layer LC disposed between the pixel electrode PE and the common electrode CE. The liquid crystal layer LC serves as a dielectric substance. The pixel electrode PE is connected to the drain electrode of the transistor TR. In an exemplary embodiment, the pixel electrode PE may be disposed between the data lines DLj and DLj+1.

In FIG. 2, the pixel electrode PE has a non-slit structure, but it should not be limited thereto or thereby. That is, according to another exemplary embodiment, the pixel electrode PE may have a slit structure defined by a trunk portion having a cross shape and a plurality of branch portions extending from the trunk portion in a radial form.

The common electrode CE may be disposed over an entire surface of the second substrate 120, however, the common electrode CE may be disposed on the first substrate 110 according to another exemplary embodiment. In this case, at least one of the pixel electrode PE and the common electrode CE may have the slit structure.

The storage capacitor Cst includes a storage electrode (not shown) branched from a storage line (not shown) and an insulating layer disposed between the pixel electrode PE and the storage electrode. The storage line is disposed on the first substrate 110 and substantially simultaneously provided with the gate lines GLi on the same layer as the gate line GLi. The storage electrode may be partially overlapped with the pixel electrode PE.

In an exemplary embodiment, the pixel may further include a color filter CF representing one of red, green, and blue colors, for example. However, the invention is not limited thereto, and the color filter CF may represent various other colors. As an example, the color filter CF may be disposed on the second substrate 120 as shown in FIG. 2. However, the color filter CF may be disposed on the first substrate 110 according to another exemplary embodiment.

The transistor TR is turned on in response to a gate signal provided through the gate line GLi. A data voltage provided through the data line DLj is applied to the pixel electrode PE of the liquid crystal capacitor Clc through the turned-on transistor TR. A common voltage is applied to the common electrode CE.

Due to a difference in voltage between the data voltage and the common voltage, an electric field is generated between the pixel electrode PE and the common electrode CE. Liquid crystal molecules of the liquid crystal layer LC are driven by the electric field generated between the pixel electrode PE and the common electrode CE. A transmittance of the light passing through the liquid crystal layer LC is controlled by the liquid crystal molecules driven by the electric field, and thus the image is displayed.

The storage line is applied with a storage voltage having a constant voltage level. However, the storage line may be applied with the common voltage according to another exemplary embodiment. The storage capacitor Cst compensates for the voltage charged in the liquid crystal capacitor Clc.

Figure 3:
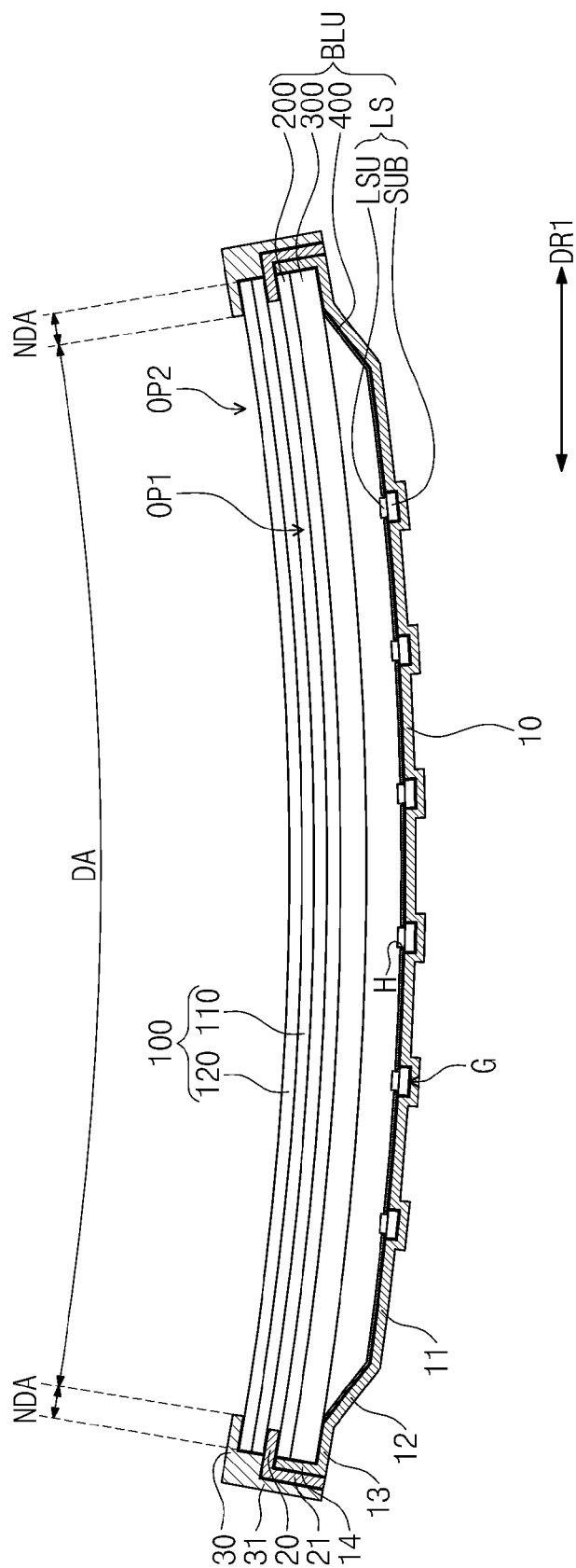
FIG. 3 is a cross-sectional view taken along line I-I' of FIG. 1.

FIG. 3 is a cross-sectional view taken along line I-I' of FIG. 1.

Referring to FIG. 3, the reflection sheet 400 is disposed on the bottom portion 11 and the inclined portion 12 of the first protective member 10. The reflection sheet 400 is disposed on the bottom portion 11 and the inclined portion 12 of the first protective member 10 except for the areas corresponding to the grooves G.

The light source substrates SUB are inserted into the grooves G and disposed in the grooves G, and the light source units LSU are inserted into the holes H of the reflection sheet 400. The reflection sheet 400 has a thickness smaller than a thickness of the light source units LSU in an up-and-down direction. The light emitted from the rear side of the light source units LSU is reflected by the reflection sheet 400 and then provided to the diffusion plate 300.

The diffusion plate 300 disposed on the reflection sheet 400 is disposed on the connection portion 13. Predetermined areas of both sides of the diffusion plate 300 are disposed on the connection portion 13. Accordingly, a predetermined space may be defined between the diffusion plate 300 and the bottom portion 11 and between the diffusion plate 300 and the inclined portion 12.

The optical sheet 200 is disposed on the diffusion plate 300. Different from the diffusion plate 300 having the rigidity, the optical sheet 200 has a thin thickness and flexibility. The optical sheet 200 disposed on the diffusion plate 300 may have the same curved shape as the diffusion plate 300.

A side surface of the diffusion plate 300 and the optical sheet 200 is adjacent to an inner side surface of the first sidewall portion 14 in the first direction DR1. Although not shown in figures, a side surface of the diffusion plate 300 and the optical sheet 200 is adjacent to an inner side surface of the second sidewall portion 15 in the second direction DR2. Therefore, the backlight unit BLU may be accommodated in the first protective member 10.

The second protective member 20 covers the predetermined area of the boundary of the optical sheet 200 of the backlight unit BLU and the first sidewall portions 14 of the first protective member 10. In addition, although not shown in cross-section, the second protective member 20 covers a predetermined area of an upper portion of the second sidewall portions 15 of the first protective member 10.

The second protective member 20 supports the non-display area NDA of the display panel 100. A predetermined area of the non-display area NDA adjacent to the boundary of the display panel 100 is disposed in a predetermined area on the second protective member 20 adjacent to the first opening OP1. The second protective member 20 includes a third sidewall portion 21 extending downward to cover an outer side surface of the first sidewall portions 14 and the predetermined area of the upper portion of the second sidewall portions 15.

The third protective member 30 covers the non-display area of the display panel 100 and the second protective member 20 on which the display panel 100 is not disposed. The display area DA of the display panel 100 is exposed through the second opening OP2 of the third protective member 30. The second opening OP2 may be smaller than the first opening OP1. The third protective member 30 includes a fourth sidewall portion 31 extending downward to be disposed on an outer side surface of the third sidewall portions 21 of the second protective member 20.

Figure 4:
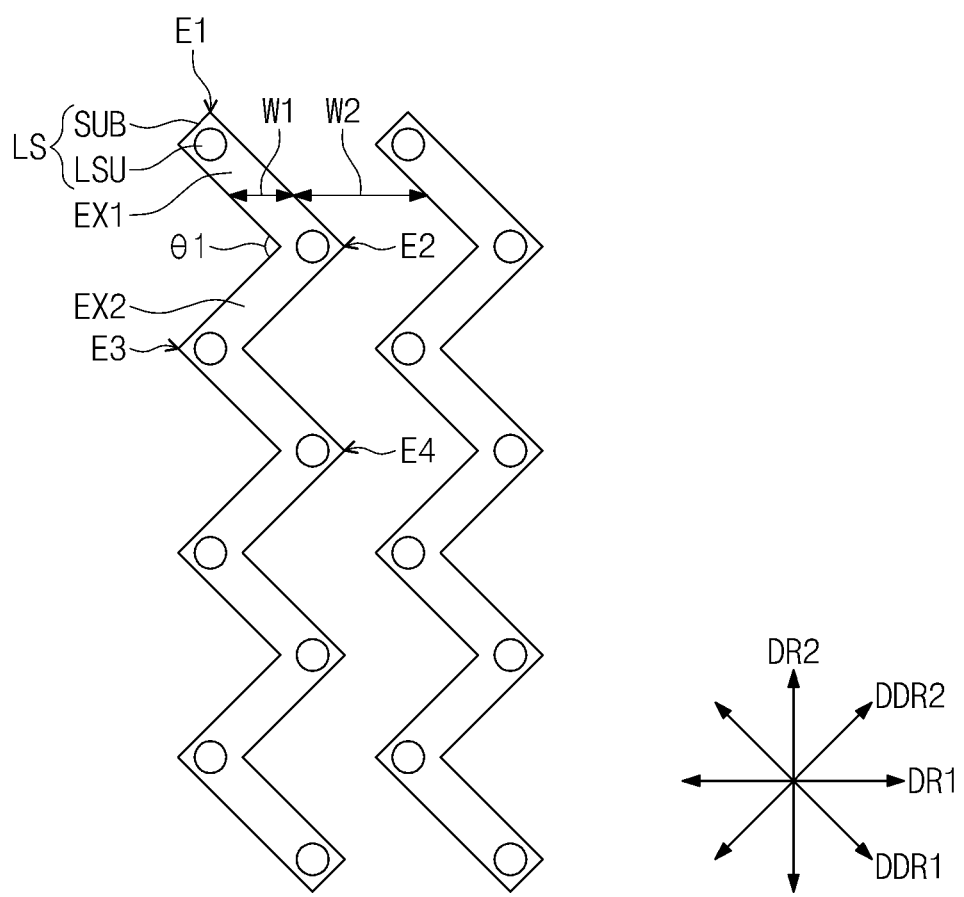
FIG. 4 is an enlarged view showing two light sources adjacent to each other among light source shown in FIG. 1.
Figure 5:
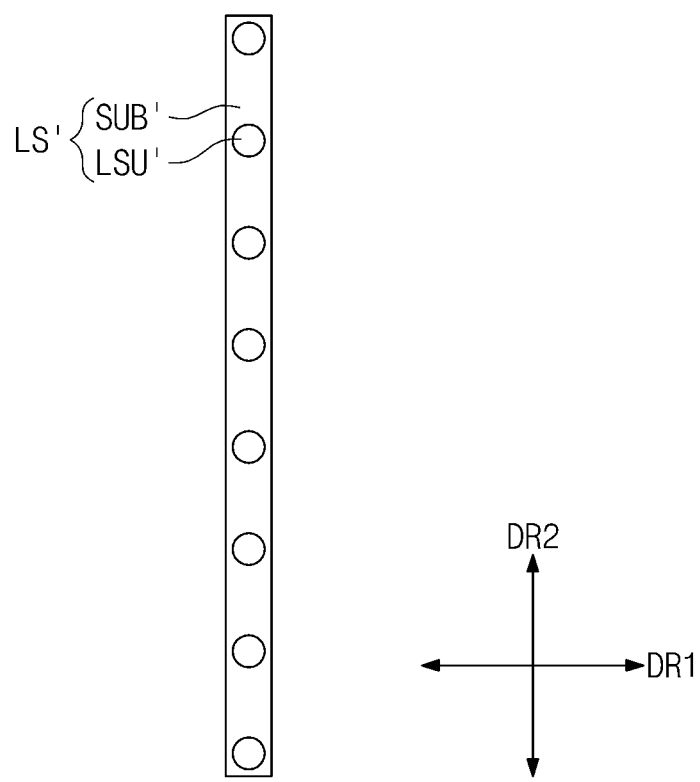
FIG. 5 is a plan view showing a comparison light source.

FIG. 4 is an enlarged view showing two light sources adjacent to each other among light source shown in FIG. 1. FIG. 5 is a plan view showing a comparison light source.

Referring to FIG. 4, each of the light source substrates SUB having the zigzag shape includes a plurality of first extending portions EX1 arranged in the second direction DR2 and spaced apart from each other at a predetermined interval and a plurality of second extending portions EX2 arranged in the second direction DR2 to be spaced apart from each other at the predetermined interval and disposed between the first extending portions EX1. The first extending portions EX1 are arranged in the second direction DR2 at regular intervals, and the second extending portions EX2 are arranged in the second direction DR2 at regular intervals.

The first extending portions EX1 extend in a first diagonal direction DDR1 crossing the first and second directions DR1 and DR2 on a plane substantially parallel to the first and second directions DR1 and DR2. The second extending portions EX2 extend in a second diagonal direction DDR2 crossing the first direction DR1, the second direction DR2, and the first diagonal direction DDR1 on a plane substantially parallel to the first and second directions DR1 and DR2. In an exemplary embodiment, the first diagonal direction DDR1 and the second diagonal direction DDR2 define an angle in a range from about 45 degrees to about 135 degrees, for example.

Each of the second extending portions EX2 connects the opposite end E2 of a k-th first extending portion EX1, which is opposite to one end E1 of the k-th first extending portion EX1, and one end E3 of a (k+1)th first extending portion EX1. The opposite end E2 of the k-th first extension portion EX1 and the one end E3 of the (k+1)th first extending portion EX1 are closer to each other than the one end E1 of the k-th first extending portion EX1 and the opposite end E4 of the (k+1)th first extending portion EX1, which is opposite to the one end E3 of the (k+1)th first extending portion EX1. Here, "k" is a natural number.

Portions at which the first extending portions EX1 are connected to the second extending portions EX2, correspond to the bending portions, and as described above, the light source units LSU are disposed at the predetermined areas of the bending portions.

The first and second extending portions EX1 and EX2 adjacent to each other are symmetrical with each other. In an exemplary embodiment, a first angle θ1 between the first and second extending portions EX1 and EX2 adjacent to each other is set to a range from about 45 degrees to about 135 degrees, which is the same as the angle between the first diagonal direction DDR1 and the second diagonal direction DDR2.

Each of the light source substrates SUB has a first width W1 in the first direction DR1. The light source substrates SUB are arranged spaced apart from each other by a second width W2 greater than the first width W1 in the first direction DR1.

Referring to FIG. 5, a comparison light source LS' includes a comparison light source substrate SUB' extending in the second direction DR2 and a plurality of comparison light source units LSU' mounted on the comparison light source substrate SUB'. The comparison light source units LSU' disposed on the comparison substrate SUB' are arranged in the second direction DR2 at regular intervals. Each comparison light source unit LSU' may be a side surface light-emitting type diode, for example.

In the illustrated exemplary embodiment, the light source units LSU are disposed at the bending portions of the zigzag shape of the light source substrates SUB. Accordingly, a distance between the light source units LSU mounted on the same light source substrate SUB is greater than a distance between the comparison light source units LSU' mounted on the comparison light source substrate SUB' extending in the second direction DR2.

Figure 6:
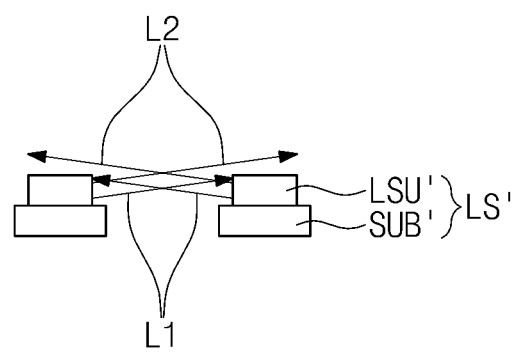
FIG. 6 is a view showing lights emitted from two comparison light source units adjacent to each other among comparison light source units shown in FIG. 5.
Figure 7:
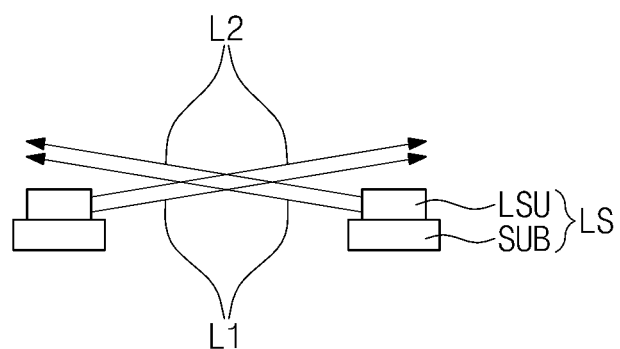
FIG. 7 is a view showing lights emitted from two light source units adjacent to each other among light source units disposed on one light source substrate shown in FIG. 4.

FIG. 6 is a view showing lights emitted from two comparison light source units adjacent to each other among comparison light source units shown in FIG. 5. FIG. 7 is a view showing lights emitted from two light source units adjacent to each other among light source units disposed on one light source substrate shown in FIG. 4.

Referring to FIG. 6, among first and second lights L1 and L2 emitted through side surfaces of the comparison light source units LSU', the second light L2 is provided to a diffusion plate, but the first light L1 is not provided to the diffusion plate since the first light L1 is blocked by the comparison light source units LSU' adjacent to each other. In this case, a brightness in a predetermined area between the comparison light source units LSU' disposed on the comparison light source substrate SUB' and adjacent to each other becomes lower than a brightness in a peripheral area, and thus the predetermined area is recognized as a dark area.

As a distance between the comparison light source units LSU' disposed on the comparison light source substrate SUB' and adjacent to each other decreases, an amount of the light blocked by the comparison light source units LSU' adjacent to each other increases, and as a result, the dark area is more significantly recognized.

Referring to FIG. 7, the distance between the light source units LSU disposed on the same light source substrate SUB and adjacent to each other is greater than the distance between the comparison light source units LSU' disposed on the comparison light source substrate SUB' and adjacent to each other.

In this case, the first and second light sources L1 and L2 emitted through the side surfaces of the light source units LSU are provided to the diffusion plate 300 (refer to FIG. 1) without being blocked by the light source units LSU adjacent to each other. As a result, the predetermined area between the light source units LSU disposed on the same light source substrate SUB and adjacent to each other is not recognized as the dark area.

Consequently, the backlight unit BLU (refer to FIG. 1) and the display device 500 (refer to FIG. 1) according to the illustrated exemplary embodiment may prevent the dark area from occurring between the light source units LSU disposed on the same light source substrate SUB and adjacent to each other as the distance between the light source units LSU disposed on the same light source substrate SUB and adjacent to each other becomes larger.

FIGS. 8 to 11 are views showing configurations of light sources of display apparatuses according to various exemplary embodiments of the invention.

Hereinafter, different features of light sources LS_1 and LS_2 shown in FIGS. 8 to 11 from the light sources LSU of the display device 500 shown in FIG. 1 will be mainly described since no other components of the display device 500 are being changed.

One light source is shown in each of FIGS. 8 to 11, but the light source may be provided in a plural number, and the light sources may be applied to various display devices.

Figure 8:
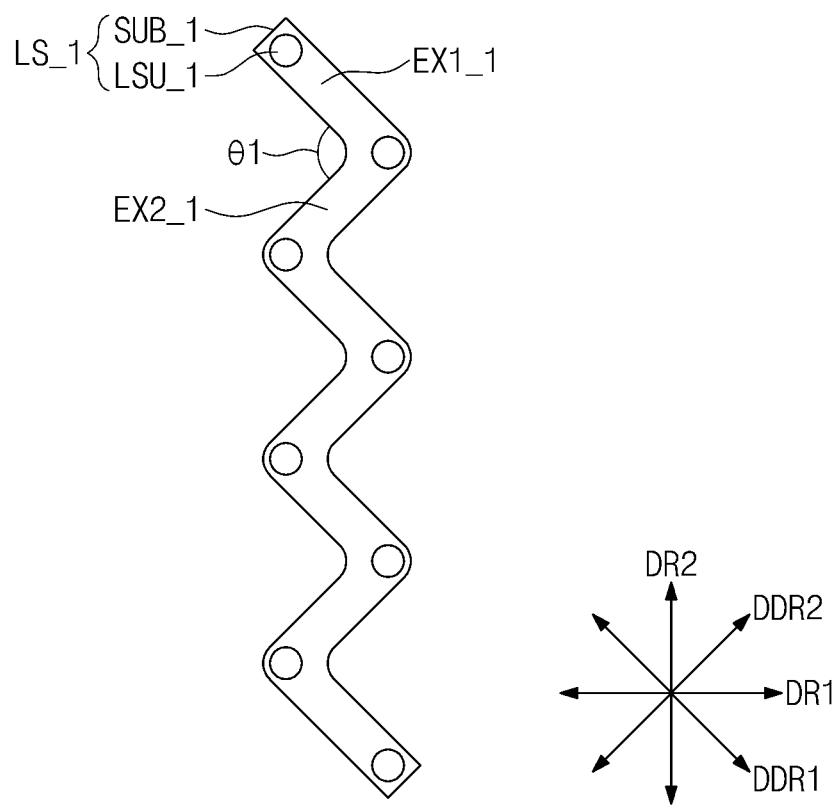
FIGS. 8 to 11 are views showing various exemplary embodiments of configurations of light sources of display apparatuses according to the invention.

Referring to FIG. 8, the light source LS_1 has substantially the same shape as that of the light sources LS shown in FIG. 1 except for a shape of bending portion of a light source substrate SUB_1. In an exemplary embodiment the light source LS_1 includes a plurality of first extending portions EX1_1 extending in the first diagonal direction DDR1 and arranged in the second direction DR2 at regular intervals and a plurality of second extending portions EX2_1 extending in the second diagonal direction DDR2 and arranged in the second direction DR2 at regular intervals, for example.

The connection configuration between the first extending portions EX1_1 and the second extending portions EX2_1 is substantially the same as the connection configuration between the first extending portions EX1 and the second extending portions EX2 described with reference to FIG. 4.

Different from the light sources LS shown in FIG. 1, bending portions at which the first extending portions EX1_1 are connected to the second extending portions EX2_1 of the light source LS_1 have a curved shape. The light source units LSU are disposed at predetermined areas of the bending portions having the curved shape.

Due to the connection configuration, the distance between the light source units LSU_1 disposed on the light source substrate SUB_1 becomes larger, and thus the dark area may be prevented from occurring between the light source units LSU_1 adjacent to each other.

Figure 9:
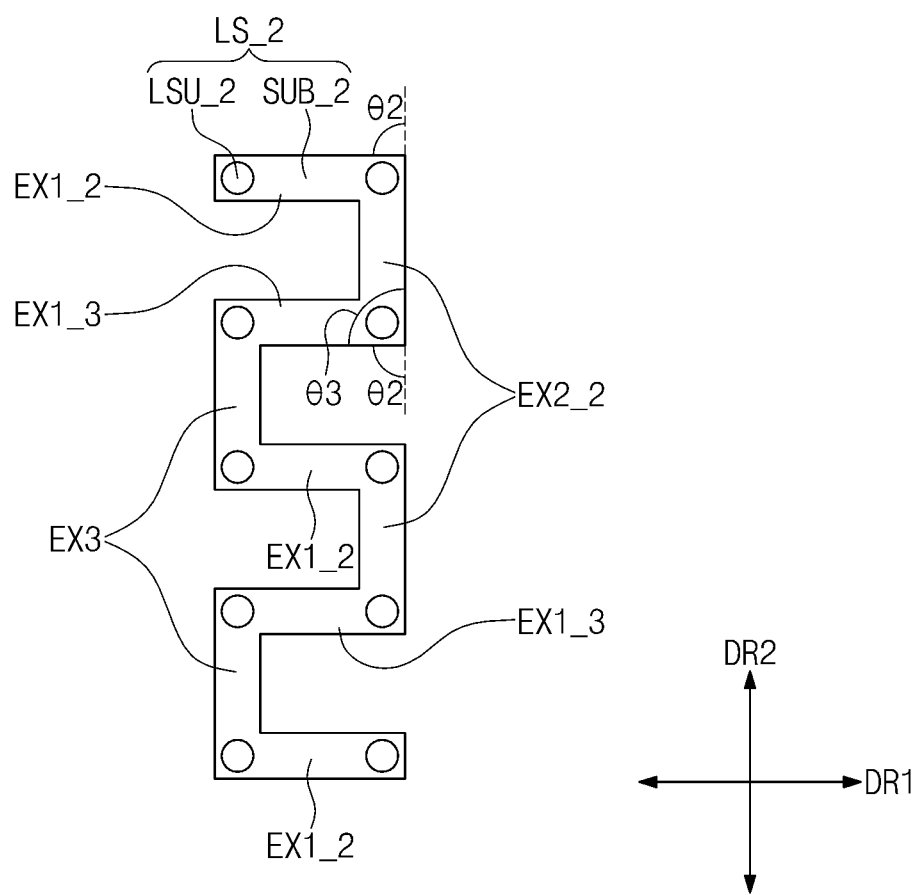
Figure 10:
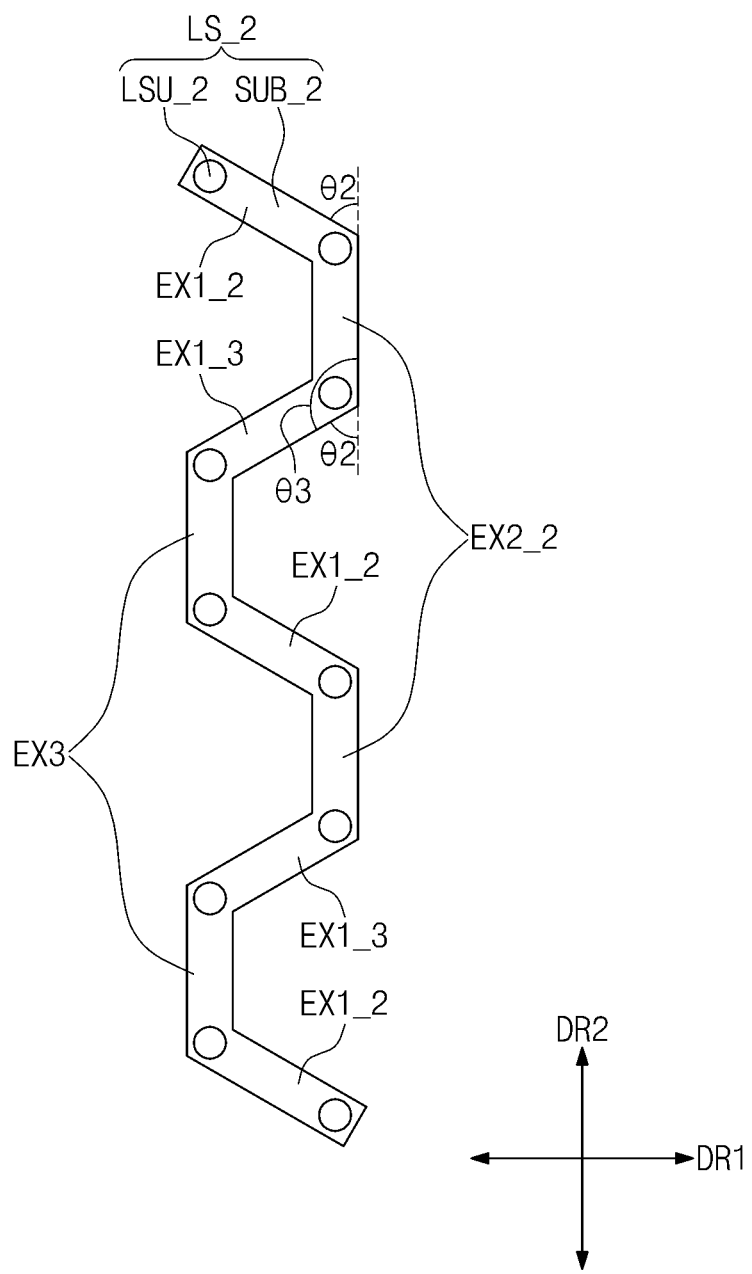
Figure 11:
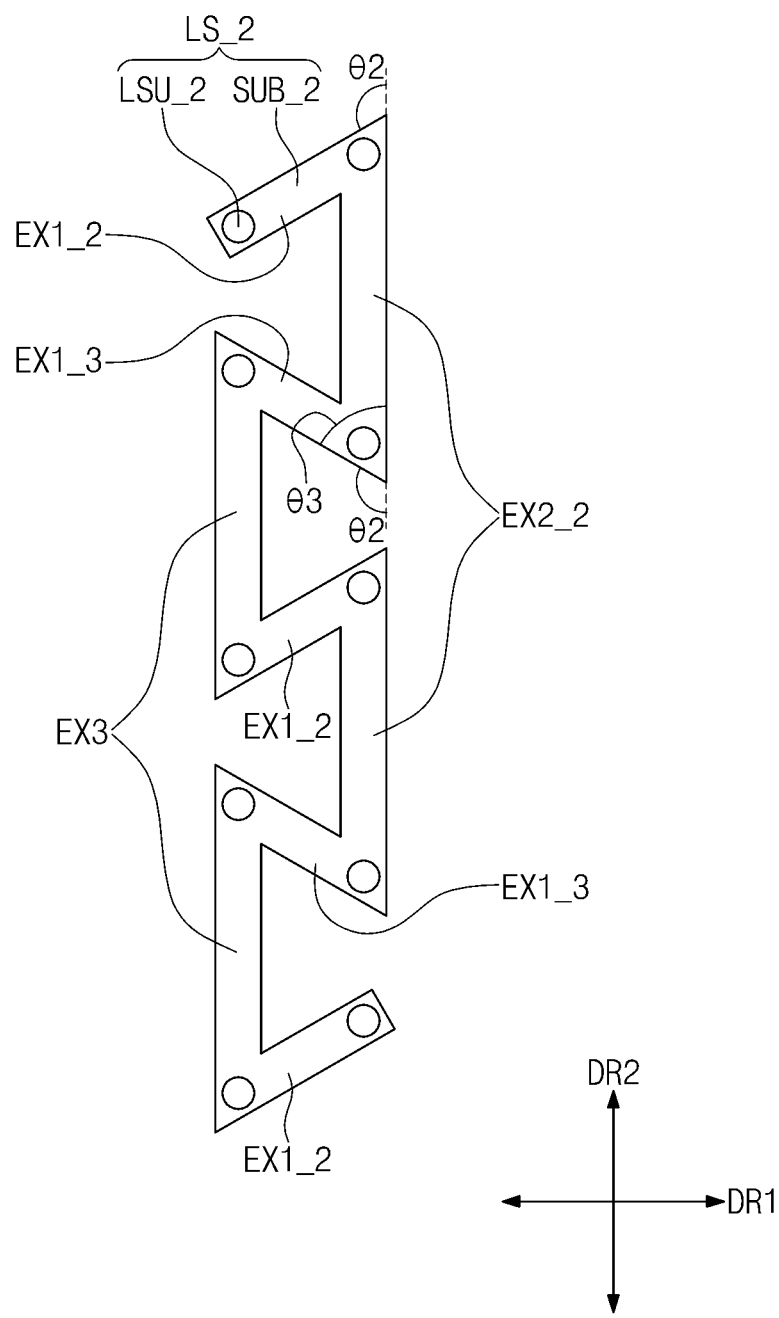

Referring to FIGS. 9 to 11, a light source substrate SUB_2, on which light source units LSU_2 are disposed, includes a plurality of first sub-extending portions EX1_2, a plurality of second sub-extending portions EX1_3, a plurality of second extending portions EX2_2, and a plurality of third extending portions EX3.

The first sub-extending portions EX1_2 are alternately arranged with the second sub-extending portions EX1_3 in the second direction DR2. The second extending portions EX2_2 extend in the second direction DR2 and are arranged in the second direction DR2. The third extending portions EX3 extend in the second direction DR2 and are arranged in the second direction DR2.

The first sub-extending portions EX1_2 defines a second angle θ2 with the second direction DR2 while being extended. Hereinafter, an angle obtained by subtracting the second angle θ2 from about 180 degrees is referred to as a third angle θ3. The second sub-extending portions EX1_3 defines the third angle θ3 with the second direction DR2 while being extended. In an exemplary embodiment, the second angle θ2 may be equal to or greater than about 30 degrees and equal to or smaller than about 150 degrees, for example.

In an exemplary embodiment, as shown in FIG. 9, the second angle θ2 may be set to about 90 degrees, for example. In this case, the first sub-extending portions EX1_2 and the second sub-extending portions EX1_3 extend in the first direction DR1.

As shown in FIG. 10, the second angle θ2 may be smaller than about 90 degrees and preferably, the second angle θ2 may be smaller than about 90 degrees and equal to or greater than about 30 degrees, for example. As shown in FIG. 11, the second angle θ2 may be greater than about 90 degrees and preferably, the second angle θ2 may be greater than about 90 degrees and equal to or smaller than about 150 degrees, for example.

Each of the second extending portions EX2_2 connects one end of a h-th first sub-extending portion EX1_2 and one end of a h-th second sub-extending portion EX1_3. Here, "h" is a natural number. Each of the third extending portions EX2_2 connects the opposite end of the h-th second sub-extending portion EX1_3, which is opposite to the one end of the h-th second sub-extending portion EX1_3, and the opposite end of a (h+1)-th first sub-extending portion EX1_2, which is opposite to one end of the (h+1)-th first sub-extending portion EX1_2.

Connection portions of the first sub-extending portions EX1_2 and the second extending portions EX2_2, connection portions of the second sub-extending portions EX1_3 and the second extending portions EX2_2, connection portions of the first sub-extending portions EX1_2 and the third extending portions EX3, and connection portions of the second sub-extending portions EX1_3 and the third extending portions EX3 correspond to bending portions. The light source units LSU_2 are disposed at predetermined areas of the bending portions, and thus the light source units LSU_2 may be more spaced apart from each other.

As described above, since the distance between the light source units LSU_2 disposed on the light source substrate SUB_2 becomes larger, the dark area may be prevented from occurring between the light source units LSU_2 adjacent to each other.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display apparatus comprising:
   a display panel which displays an image using a light;
   a backlight unit which generates the light and provides the light to the display panel, the backlight unit comprising:
      a plurality of light source units which generate the light; and
      a plurality of light source substrates arranged in a first direction, the plurality of light source units disposed on the plurality of light source substrates, wherein each of the plurality of light source substrates has a zigzag shape, and each of the plurality of light source units is disposed at bending portions defining the zigzag shape, and
   a first protective member to accommodate the backlight unit,
   wherein a plurality of grooves each having a zigzag shape is defined in the first protective member, and the plurality of light source substrates is inserted into the grooves.

2. The display apparatus of claim 1, wherein each of the plurality of light source substrates comprises:
   a plurality of first extending portions arranged in a second direction crossing the first direction; and
   a plurality of second extending portions arranged in the second direction and disposed between the plurality of first extending portions, the plurality of first extending portions extend in a first diagonal direction crossing the first and second directions on a plane substantially parallel to the first and second directions, the plurality of second extending portions extend in a second diagonal direction crossing the first direction, the second direction, and the first diagonal direction on the plane, each of the plurality of second extending portions connects an opposite end of a k-th first extending portion, which is opposite to one end of the k-th first extending portion, and one end of a (k+1)th first extending portion, and the "k" is a natural number.

3. The display apparatus of claim 2, wherein the opposite end of the k-th first extension portion and the one end of the (k+1)th first extending portion are closer to each other than the one end of the k-th first extending portion and an opposite end of the (k+1)th first extending portion, which is opposite to the one end of the (k+1)th first extending portion.

4. The display apparatus of claim 2, wherein the plurality of light source units is disposed at connection portions of the plurality of first extending portions and the plurality of second extending portions, which are defined by the bending portions.

5. The display apparatus of claim 2, wherein the plurality of first and second extending portions adjacent to each other define a first angle.

6. The display apparatus of claim 5, wherein the first angle is in a range from about 45 degrees to about 135 degrees.

7. The display apparatus of claim 5, wherein the plurality of first and second extending portions adjacent to each other are symmetrical with each other.

8. The display apparatus of claim 2, wherein each of the plurality of light source substrates has a first width in the first direction, and the plurality of light source substrates is arranged spaced apart from each other by a second width greater than the first width in the first direction.

9. The display apparatus of claim 1, wherein the backlight unit and the display panel are curved with respect to the first direction and substantially parallel to a second direction crossing the first direction.

10. The display apparatus of claim 1, wherein the backlight unit further comprises:
   a reflection sheet in which a plurality of holes into which the plurality of light source units is inserted is defined;
   a diffusion plate disposed on the plurality of light source units to diffuse the light provided from the plurality of light source units; and
   an optical sheet disposed on the diffusion plate to diffuse and condense the light from the diffusion plate, and the display panel is disposed on the optical sheet.

11. The display apparatus of claim 1, wherein each of the plurality of light source units comprises a side surface light-emitting type diode.

12. The display apparatus of claim 1, wherein the bending portions have a curved shape.

13. A backlight unit comprising:
a plurality of light source units which generate a light;
a plurality of light source substrates arranged in a first direction, the plurality of light source units disposed on the plurality of light source substrates, each of the plurality of light source substrates comprising:
a plurality of first extending portions arranged in a second direction crossing the first direction; and
a plurality of second extending portions arranged in the second direction and disposed between the plurality of first extending portions, wherein the plurality of first extending portions extends in a first diagonal direction crossing the first and second directions on a plane substantially parallel to the first and second directions, the plurality of second extending portions extend in a second diagonal direction crossing the first direction, the second direction, and the first diagonal direction on the plane, and each of the plurality of second extending portions connects an opposite end of a k-th first extending portion, which is opposite to one end of the k-th first extending portion, and one end of a (k+1)th first extending portion,
and
a first protective member to accommodate the plurality of light source substrates,
wherein a plurality of grooves each having a shape corresponding to a shape of each of the plurality of light source substrates extending along the first direction is defined in the first protective member, and the plurality of light source substrates is inserted into the grooves.

14. The backlight unit of claim 13, wherein the opposite end of the k-th first extension portion and the one end of the (k+1)th first extending portion are closer to each other than the one end of the k-th first extending portion and an opposite end of the (k+1)th first extending portion, which is opposite to the one end of the (k+1)th first extending portion.

15. The backlight unit of claim 13, wherein the plurality of light source units is disposed at bending portions corresponding to predetermined areas of connection portions of the plurality of first extending portions and the plurality of second extending portions.

16. The backlight unit of claim 13, wherein the plurality of first and second extending portions adjacent to each other define an angle from about 45 degrees to about 135 degrees, and the plurality of first and second extending portions adjacent to each other are symmetrical with each other.

17. The backlight unit of claim 13, wherein each of the plurality of light source substrates has a first width in the first direction, and the plurality of light source substrates is arranged spaced apart from each other by a second width greater than the first width in the first direction.

18. The backlight unit of claim 13, wherein each of the plurality of light source units comprises a side surface light-emitting type diode.

19. A display apparatus comprising:
a display panel which displays an image using a light; and
a backlight unit which generates the light and provides the light to the display panel, the backlight unit comprising:
a plurality of light source units which generate the light; and
a plurality of light source substrates arranged in a first direction, the plurality of light source units disposed on the plurality of light source substrates, wherein each of the plurality of light source substrates comprises:
a first sub-extending portions arranged in a second direction crossing the first direction;
a second sub-extending portions alternately arranged with the first sub-extending portions in the second direction;
a plurality of second extending portions extending in the second direction and arranged in the second direction; and
a plurality of third extending portions extending in the second direction and arranged in the second direction, wherein the first sub-extending portions extend to define a second angle with the second direction, the second sub-extending portions extend to define a third angle, which is obtained by subtracting the second angle from about 180 degrees, with the second direction, each of the plurality of second extending portions connects one end of a h-th first sub-extending portion and one end of a h-th second sub-extending portion, each of the third extending portions connects an opposite end of the h-th second sub-extending portion, which is opposite to the one end of the h-th second sub-extending portion, and an opposite end of a (h+1)-th first sub-extending portion, which is opposite to one end of the (h+1)-th first sub-extending portion, and the plurality of light source units is disposed at predetermined areas of connection portions of the first and second sub-extending portions and the second and third extending portions.

20. The display device of claim 19, wherein the second angle is greater than about 30 degrees and smaller than about 150 degrees.

21. The display device of claim 19, wherein the second angle is about 90 degrees.

22. The display device of claim 19, wherein the second angle is equal to or greater than about 30 degrees and smaller than about 90 degrees.

23. The display device of claim 19, wherein the second angle is greater than about 90 degrees and equal to or smaller than about 150 degrees.

* * * * *